United States Patent [19]
Olstowski

[11] 3,933,705

[45] Jan. 20, 1976

[54] RAPID-SETTING POLYURETHANES PREPARED IN THE PRESENCE OF A FATTY MATERIAL AND AN ALIPHATIC LIQUID HYDROCARBON

[75] Inventor: Franciszek Olstowski, Freeport, Tex.

[73] Assignee: The Dow Chemical Company, Midland, Mich.

[22] Filed: Nov. 7, 1974

[21] Appl. No.: 521,592

Related U.S. Application Data

[63] Continuation-in-part of Ser. No. 449,873, March 11, 1974, abandoned, which is a continuation-in-part of Ser. No. 392,590, Aug. 29, 1973, abandoned.

[52] U.S. Cl. .................. 260/18 TN; 260/33.6 UB; 260/77.5 AM
[51] Int. Cl.² ........................................... C08K 5/01
[58] Field of Search ............. 260/18 TN, 33.6 UB, 77.5 AM

[56] References Cited

UNITED STATES PATENTS

| | | | |
|---|---|---|---|
| 3,165,483 | 1/1965 | Gemeinhardt et al. | 260/2.5 |
| 3,747,037 | 7/1973 | Earing | 260/18 TN |
| 3,751,392 | 8/1973 | Olstowski et al. | 260/2.5 AP |
| 3,753,933 | 8/1973 | Olstowski et al. | 260/2.5 AK |
| 3,755,222 | 8/1973 | Gruber et al. | 260/18 TN |

*Primary Examiner*—Eugene C. Rzucidlo
*Attorney, Agent, or Firm*—James G. Carter

[57] ABSTRACT

Rapid-setting polyurethanes are prepared employing on the modifier component therein a mixture of a liquid aliphatic hydrocarbon boiling above about 150°C and a liquid fatty acid or fatty oil boiling above about 150°C.

21 Claims, No Drawings

RAPID-SETTING POLYURETHANES PREPARED IN THE PRESENCE OF A FATTY MATERIAL AND AN ALIPHATIC LIQUID HYDROCARBON

This application is a continuation-in-part of my previous application Ser. No. 449,873, filed Mar. 11, 1974, now abandoned which is a continuation-in-part of application Ser. No. 392,590, filed Aug. 29, 1973, now abandoned.

This invention relates to rapid-setting polyurethanes and, more particularly, to rapid-setting polyurethanes containing aliphatic hydrocarbon modifiers.

Rapid-setting, rigid polyurethanes are well known in the art, such as those described in U.S. Pat. Nos. 3,375,511, 3,726,827, 3,746,692, applications Ser. No. 327,630, filed Jan. 29, 1973, Ser. No. 327,718, filed Jan. 29, 1973.

It is believed to be desirable to employ aliphatic hydrocarbons boiling above about 150°C as a modifier component therein for various reasons such as:

a. to obtain low viscosity polyol or polyisocyanate blends by diluting either or both components with a low viscosity aliphatic hydrocarbon solvent, since such solvents are relatively inexpensive, b. employ a low friction or a lubricating modifier so that the resultant polyurethane could be employed as a bearing surface, and c. employ a low odor modifier such that in operations employing castings of rapidsetting polyurethanes, such as sawing, machining, drilling and the like, repulsive or irritating odors are not released during such operations. For example, trichlorobenzene is a known modifier for rapid-setting polyurethane compositions and polyurethanes produced therefrom are relatively odor-free until sawing, drilling or machining operations are performed thereon which releases the odor of such modifiers to the atmosphere.

Attempts to employ such aliphatic hydrocarbon compounds as the modifier component in rapid-setting polyurethane compositions have resulted in a rejection of such substances by the urethane-forming system i.e., the aliphatic hydrocarbons are not compatible with the urethaneforming mixture.

The rejection or incompatibility problem has unexpectedly been solved by the use of, as the modifier component therein a mixture of a liquid aliphatic hydrocarbon with a liquid fatty acid or fatty oil.

The present invention is therefore directed to solid, rigid non-cellular, non-porous polyurethanes having a density of at least about 1 g/cc, resulting from the admixture of the components of a polyurethane-forming composition, which can be demolded within 5 minutes, said polyurethane-forming composition comprising A. a polyether polyol having a functionality of from 2 to about 8 and a hydroxyl equivalent weight of from about 60 to less than about 250, preferably from about 75 to about 200;

B. an organic polyisocyanate;

C. a modifier composition consisting essentially of
1. from about 85 to about 30 and preferably from about 80 to about 50 percent by weight of a liquid aliphatic hydrocarbon having a boiling point of at least about 150°C and
2. from about 15 to about 70 and preferably from about 20 to about 50 percent by weight of a liquid fatty acid, fatty oil or mixture thereof having a boiling point of at least about 150°C; and D. A non-amine containing catalyst for urethane formation;

wherein components (A) and (B) are present in quantities so as to provide an NCO:OH ratio of from about 0.8:1 to about 2:1, preferably from about 0.95:1 to about 1.1:1; component (C) is present in quantities of from about 10 to about 50 and preferably from about 20 to about 40 percent by weight of the sum of components (A), (B) and (C); component (D) is present in quantities of from about 0.1 to about 10 percent and preferably from about 0.1 to about 2 percent by weight of the sum of the weights of components (A), (B) and (C); with the proviso that when component (A) is an amine initiated polyether polyol, the quantity of component (D) may be zero and when component (A) is a difunctional polyether polyol, then the average NCO-functionality of component (B) is at least about 2.5.

By the term "rigid" or non-elastomeric as used herein, it is meant that the compositions which when solidified or set have percent elongation values at the break point of less than 100 percent.

By the term "solid" as used herein, it is meant that the compositions when solidified or set have densities of at least 1 gram per cubic centimeter.

Suitable polyols for use in the present invention are those known to be useful in the preparation of rapid-setting polyurethanes having 2-8 hydroxyl groups and an equivalent weight of from about 75 to about 230 as taught and described in U.S. Pat. Nos. 2,726,827; 3,746,692, pending application Ser. Nos. 358,245, filed May 7, 1973; 327,630, filed Jan. 29, 1973 and 327,718 filed Jan. 29, 1973.

Suitable dihydroxyl-containing compounds having an OH equivalent weight below about 250 which are employed as component (A) include, for example, ethylene glycol, propylene glycol, butylene glycol, pentanediol, hexanediol, diethylene glycol, dipropylene glycol, bisphenol A, resorcinol, catechol, hydroquinone, mixtures thereof, adducts of a dihydroxyl-containing compound and a vicinal epoxy compound such as, for example, ethylene oxide, 1,2-propylene oxide, 1,2-butylene oxide, styrene oxide, epichlorohydrin, epibromohydrin, mixtures thereof and the like. When the dihydroxyl containing compound is a solid it is suitably employed by dissolving it in a suitable solvent such as, for example, a liquid polyol, tri-n-butyl phosphate, triethyl phosphate and the like.

Suitable amine initiated polyether polyols which are employed as component (A) in the present invention include, for example, those prepared by reacting an alkylene oxide with an amine having from 3 to about 8 active hydrogen atoms.

Suitable amines include, for example, ammonia, ethylenediamine, 1,3-diaminopropane, 1,4-diaminobutane, 1,5-diaminopropane, 1,6-diaminohexane, diethylenetriamine, tetraethylenepentamine, pentaethylenehexamine, mixtures thereof and the like.

Suitable alkylene oxides include, for example, ethylene oxide, 1,2-propylene oxide, 1,2-butylene oxide, 2,3-butylene oxide, styrene oxide, epichlorohydrin, epibromohydrin, epiiodohydrin, mixtures thereof and the like.

Suitable initiator compounds having from 3 to 8 hydroxyl groups which are employed to prepare polyols (component A) employed in the present invention include, for example, glycerine, trimethylolpropane, pentaerythritol, sorbitol, sucrose, mixtures thereof and the like.

Suitable vicinal epoxy compounds which may be reacted with the initiator compounds to prepare polyols employed as component A in the present invention include, for example, the lower alkylene oxides and substituted alkylene oxides such as ethylene oxide, 1,2-propylene oxide, 1,2-butylene oxide, 2,3-butylene oxide, epichlorohydrin, epibromohydrin, epiiodohydrin, styrene oxide, mixtures thereof and the like.

Suitable polyisocyanates and catalysts which are useful in the present invention are also described in the above mentioned patents and pending applications.

Suitable organic polyisocyanates which may be employed as component (B) in the present invention include, for example, any organic polyisocyanate having 2 or more NCO groups per molecule and no other substituents capable of reacting with the hydroxyl groups of the polyether polyols employed as component (A). Suitable such polyisocyanates include, for example, 2,4-toluenediisocyanate, 2,6-toluenediisocyanate, hexamethylene diisocyanate, p,p'-diphenylmethanediisocyanate, p-phenylenediisocyanate, hydrogenated methylene diphenyldiisocyanate (e.g. Hylene W) nappthalene diisocyanate, dianisidine diisocyanate, polymethylene polyphenylisocyanate, mixtures of one or more polyisocyanates and the like.

Other organic isocyanates which are suitably employed and which are to be included in the term organic polyisocyanate include isocyanate terminated prepolymers prepared from the previously mentioned polyols and the above mentioned isocyanates.

Suitable organic polyisocyanates which may be employed as component (B) in the polyurethane compositions of the present invention when component (A) has a functionality of 2 include those having an average NCO functionality of at least about 2.5 such as, for example, the polymethylene polyphenyl isocyanates, NCO-containing prepolymers such as the reaction products of an excess of an organic diisocyanate with polyhydroxyl containing compounds having from 3 to about 8 OH groups per molecule such as, for example, glycerine, trimethylolpropane, pentaerythritol, sorbitol, sucrose, mixtures thereof and mixtures with dihydroxyl-containing compounds such that the average hydroxyl functionality of the mixture is at least about 2.5. It is preferred that the organic polyisocyanate be liquid; however, in the event that it is a solid or semi-solid or of a relatively high viscosity such that blending with the other components would be difficult or inconvenient, they may be prepared in a suitable solvent such as, for example, trichlorobenzene, propylene carbonate and the like.

Suitable organic diisocyanates which are employed in the preparation of the prepolymers containing an average of at least 2.5 NCO groups include for example, 2,4-toluenediisocyanate, 2,6-toluenediisocyanate, hexamethylene diisocyanate, p,p'-diphenylmethanediisocyanate, p-phenylenediisocyanate, hydrogenated methylene diphenyldiisocyanate (e.g. Hylene W) naphthalene diisocyanate, dianisidine diisocyanate, mixtures of one or more polyisocyanates and the like.

The prepolymers employed as the polyisocyanate, component (B), in the present invention have a percent free NCO content of from about 8 to about 40 and preferably from about 12 to about 32 percent by weight.

Suitable organo-metal catalysts for urethane formation include, for example, organo-metal compounds of tin, zinc, lead, mercury, cadmium, bismuth, cobalt, antimony, iron and the like such as, for example, metal salts of a carboxylic acid having from about 2 to about 20 carbon atoms including, for example, stannous octoate, dibutyltin dilaurate, dibutyltin diacetate, ferric acetyl acetonate, lead octoate, lead oleate, phenylmercuric propionate, cobalt naphthenate, lead naphthenate, mixtures thereof and the like.

It is preferred that the catalysts be employed in liquid form. Those catalysts which are not ordinarily liquids are preferably added as a solution in a solvent. Suitable such solvents include, for example, dioctylphthalate, polyoxyalkylene glycols, mineral spirits, dipropylene glycol, mixtures thereof and the like.

So much of the above U.S. patents and pending applications as pertains to suitable polyols, polyisocyanates, catalysts and their relationship as to function and quantity to prepare rapid-setting polyurethanes are incorporated herein by reference.

As described in one or more of the above patents and pending applications, when the polyol is an amine-initiated polyol, a catalyst is not required and when a polyol having a functionality of 2 is employed, the polyisocyanate employed has an average functionality of at least about 2.5.

Suitable liquid aliphatic hydrocarbons having a boiling point above about 150°C which can be employed herein as one component of the modifier component include, for example, petroleum distillates such as kerosene, gas oil, lubricating oil, Stoddards solvents as well as the substantially pure aliphatic hydrocarbons such as n-decane, triisobutylene, n-dodecane, n-pentadecane, 1-methyl-4-isopropylcyclohexane, ethyl cycloheptane, cyclononane, 1,3-diethylcyclohexane, mixtures thereof and the like.

The petroleum distillates may or may not contain minor amounts of aromatic compounds, which is usually dependent upon the source of the crude petroleum, i.e., some crude oils contain aromatic hydrocarbons and the distillates are usually a certain boiling point fraction or cut from the crude petroleum.

The term "Stoddards solvent" as employed herein means a petroleum distillate clear and free from suspended matter and undissolved water, having a minimum flash point of 100°F, a distillation range of not less than 50 percent at 350°F (177°C), 90 percent at 375°F (190°C), an end point not greater than 410°F (210°C), and containing less than 20% aromatic constituents.

Suitable fatty acids and naturally occurring fatty oils which may be employed as the liquid modifier compounds (Component C) in the present invention include those having from about 6 to about 24 carbon atoms and preferably the unsaturated fatty acids having from about 14 to about 20 carbon atoms. Suitable such acids include, for example, oleic acid, octanoic acid, linoleic acid, linolenic acid, and the like. The fatty acids resulting from the hydrolysis of naturally occurring oils of animal and vegetable origin including for example, linseed oil, castor oil, tung oil, fish oil, soya oil and the like and such acids as are produced as by-products in chemical processes including for example, tall oil, the by-product resulting from the conversion of wood pulp to paper by the sulfate process, mixtures of any of the above and the like.

Also operable as the liquid modifier compound are the naturally occurring fatty oils having boiling points above about 150°C including, for example, linseed oil, castor oil, tung oil, fish oil, soya oil, and the like.

Suitable materials from which adequate molds, for casting the compositions of the present invention, may be prepared include polymers such as, for example, polyethylene, polypropylene, their copolymers and the like, polyurethanes, polysiloxane elastomers, Mylar, cured polyepoxides, mixtures thereof and the like.

It is preferred to employ relatively thin wall molds or molds having a low heat capacity or thermal conductivity. Heavy molds made of relatively high thermal conductivity materials such as aluminum, copper, iron or steel and the like may present curing problems, i.e., the reactants may not be readily demolded unless the mold is preheated to about 50°–90°C, especially when casting relatively thin sections. However, high thermal conductivity materials such as copper or aluminum can be employed as thin wall molds without preheating if the thermal capacity of the mold is relatively low compared to the amount of heat liberated in the casting.

The compositions of the present invention are useful as, but not restricted to such uses as, a casting material for preparing bearing surfaces, annular spacers, decorative objects, furniture or furniture components, gears or other machine components, threaded protective plugs and caps, and the like.

The following examples are illustrative of the present invention.

In each of the following examples and comparative experiments, all of the components except the catalyst were blended together and then the catalyst was rapidly belnded and poured into either a Mylar tray or a polyethylene beaker. In those instances where an amine initiated polyol was employed, wherein no catalyst is required, all of the components were blended together except the polyisocyanate which was later rapidly blended and the resultant mixture poured into a polyethylene beaker or a Mylar tray.

The components and results are given in the following Table.

TABLE

| COMPONENT AND PROPERTY | Ex. 1 | Comp Ex. A | Comp. Ex. B | Ex. 2 | Comp. Ex. C | Ex. 3 | Comp. Ex. D | Ex. 4 | Example 5 |
|---|---|---|---|---|---|---|---|---|---|
| Polyol, Type/grams | A/30 | A/30 | A/30 | B/50 | B/50 | B/30 | B/30 | B/60 | C/46 |
| Polyisocyanate, Type/g. | A/30 | A/30 | A/30 | A/50 | A/50 | A/30 | A/30 | A/60 | B/92 |
| Aliphatic Modifier, type/grams | A/20 | A/20 | 0 | B/40 | B/40 | C/20 | D/20 | C/20 | B/40 |
| Fatty Modifier, type/grams | A/10 | 0 | 0 | B/10 | 0 | A/10 | A/10 | A/10 | C/20 |
| Catalyst, Type/cc | A/1 | A/1 | A/1 | A/1 | A/1 | A/1 | A/1 | A/1 | A/1 |
| Mold Type | PE[3] | PE | PE | M[2] | M | PE | PE | M | M |
| Density, grams/cc | >1 | N.D. | 0.23 | >1 | N.D. | >1 | 0.55 | >4 | >1 |
| Solidification time[1], sec. | <25 | 25 | 10 | <60 | N.D. | 20 | 20 | 20 | <45 |
| Demold time[1], sec. | <60 | N.D. | N.D. | <180 | N.D. | 120 | N.D. | <180 | <150 |
| Tensile strength, psi/% elongation | N.D.[4] | N.D. | N.D. | 3235/5 | 250/ | N.D. | N.D. | 7055/6 | 4926/7 |
| REMARKS | rigid, solid, non-porous product | liquid phase rejected from the polymer mass | polymer swelled, developed large fissures | | gross rejection of modifier from polymer mass | rigid non-porous solid product | swelled, porous, bubble-containing mass | | |

| COMPONENT AND PROPERTY | EXAMPLE 6 | EXAMPLE 7 | EXAMPLE 8 | EXAMPLE 9 | Comp. Ex. E | Comp. Ex. F | Comp. Ex. G | EXAMPLE 10 |
|---|---|---|---|---|---|---|---|---|
| Polyol, Type/grams | B/30 | B/30 | B/30 | A/40 | A/30 | A/30 | A/30 | A/30 |
| Polyisocyanate, Type/g. | C/45 | A/30 | A/30 | A/40 | A/30 | A/30 | A/30 | A/30 |
| Aliphatic Modifier, type/grams | B/20 | E/10 | F/10 | G/30 | A/20 | A/30 | A/20 | A/20 |
| Fatty Modifier, type/grams | A/10 | A/5 | A/10 | A/10 | A/10 | A/10 | A/10 | A/10 |
| Catalyst, Type/cc | A/1 | A/1 | A/1 | A/1 | B/1 | C/1 | D/1 | E/1 |
| Mold Type | M | PE | PE | PE | PE | PE | PE | PE |
| Density, grams/cc | >1 | >1 | >1 | >1 | N.D. | N.D. | N.D. | >1 |
| Solidification time[1], sec. | <60 | <20 | <20 | <30 | N.D. | N.D. | N.D. | <45 |
| Demold time[1], sec. | <180 | <60 | <60 | <60 | N.D. | N.D. | N.D. | <180 |
| Tensile strength, psi/% elongation | 5588/5 | N.D. | N.D. | N.D. | N.D. | N.D. | N.D. | N.D. |
| REMARKS | Rigid, solid, non-porous product | Rigid, solid, opaque white product | Rigid, solid, non-porous product | Rigid, solid, non-porous product | Liquid phase grossly rejected Large voids present in polymerized resin | | | solid, white, opaque bubble-free resin |

| COMPONENT AND PROPERTY | Ex. 11 | Ex. 12 | Ex. 13 | Ex. 14 | Example 15 | Comp. Ex. H | EXAMPLE 16 | Comp. Ex. I |
|---|---|---|---|---|---|---|---|---|
| Polyol, Type/grams | A/30 | D/50 | E/26 | F/51 | G/60 | G/60 | B/46 | H/40 |
| Polyisocyanate, Type/g. | A/30 | A/30 | A/30 | A/44 | A/30 | A/30 | A/55 | A/40 |
| Aliphatic Modifier, type/grams | A/20 | B/20 | E/10 | A/30 | A/30 | A/30 | A/50 | 0 |
| Fatty Modifier, type/grams | A/10 | B/5 | B/20 | C/10 | A/10 | 0 | A/10 | A/40 |
| catalyst, Type/cc | F/1 | A/1 | A/1 | A/1 | A/1 | A/1 | 0 | 0 |
| Mold Type | PE | PE | PE | M | M | M | M | PE |
| Density, grams/cc | >1 | >1 | >1 | >1 | >1 | N.D. | >1 | 0.2 |
| Solidification time[1], sec. | 60 | 30 | 30 | <20 | <35 | 30 | <30 | 30 |
| Demold time[1], sec. | <240 | 180 | <180 | 60 | <75 | N.D. | <90 | <90 |
| Tensile strength, psi/% elongation | N.D. | N.D. | N.D. | N.D. | 4756/6 | N.D. | N.D. | N.D. |

TABLE-continued

| COMPONENT AND PROPERTY | Ex. 1 | Comp Ex. A | Comp. Ex. B | Ex. 2 | Comp. Ex. C | Ex. 3 | Comp. Ex. D | Ex. 4 | Example 5 |
|---|---|---|---|---|---|---|---|---|---|
| REMARKS | Solid, bubble-free resin | Solid, white, opaque, bubble-free resin | Solid, white, opaque, bubble-free resin | Solid, opaque, bubble-free resin | | During solidification, a liquid phase exuded from the solid polymer. Resultant polymer had a deeply pitted surface. | | | |

| COMPONENT AND PROPERTY | EXAMPLE 17 | EXAMPLE 18 | EXAMPLE 19 | EXAMPLE 20 | EXAMPLE 21 | Comparative Experiment J |
|---|---|---|---|---|---|---|
| Polyol, Type/grams | I/24 | G/50 | B/30 | B/30 | B/30 | B/30 |
| Polyisocyanate, Type/g. | A/30 | D/30 | A/30 | A/30 | A/30 | A/30 |
| Aliphatic modifier, type/grams | B/20 | B/20 | B/20 | E/20 | A/25 | A/26.25 |
| Fatty Modifier, type/grams | A/5 | B/10 | D/10 | E/10 | C/5 | C/3.75 |
| Catalyst, Type/cc | O | A/1 | A/1 | A/1 | A/1 | A/1 |
| Mold Type | PE | PE | PE | PE | PE | PE |
| Density, grams/cc | >1 | >1 | >1 | >1 | >1 | N.D. |
| Solidification time¹,sec. | 20 | <30 | <30 | <30 | <30 | N.D. |
| Demold time¹, sec. | <60 | <60 | <90 | <90 | <90 | N.D. |
| Tensile strength, psi/% elongation | N.D. | N.D. | N.D. | N.D. | N.D. | N.D. |
| REMARKS | | Solid, rigid, bubble-free resin | | rejected, Large voids present in polymerized resin | | Liquid phase grossly |

Footnotes to Table:
¹The time was measured from the instant all of the components were blended together.
²M indicates a Mylar tray was employed on the mold.
³PE indicates a polyethylene beaker was employed as the mold.
⁴N.D. indicates that the property was not determined.

POLYOL A was the reaction product of pentaerythritol with propylene oxide to an OH equivalent weight of about 87.
POLYOL B was the reaction product of glycerine with propylene oxide to an OH equivalent weight of about 87.
POLYOL C was dipropylene glycol.
POLYOL D was the reaction product of glycerine with propylene oxide to an equivalent weight of about 150.
POLYOL E was the reaction product of glycerine with ethylene oxide to an equivalent weight of about 78.
POLYOL F was the reaction product of sucrose with propylene oxide to an equivalent weight of about 127.
POLYOL G was the reaction product of sucrose with propylene oxide to an equivalent weight of about 160.
POLYOL H was the reaction product of diethylene triamine with propylene oxide in a molar ratio of about 1:5 respectively and having an OH equivalent weight of about 76.
POLYOL I was the reaction product of amino ethyl ethanol amine reacted with propylene oxide in a molar ratio of about 1:3 respectively having a hydroxyl equivalent weight of about 72.
POLYISOCYANATE A was an 80/20 mixture of 2,4-/2,6-toluene diisocyanate having an NCO equivalent weight of about 87.
POLYISOCYANATE B was a polymethylene polyphenylisocyanate having an NCO equivalent weight of about 134 and an average functionality of about 2.6.
POLYISOCYANATE C was a prepolymer prepared by reacting an excess of polyisocyanate S with polyol B, the resultant prepolymer contained about 32 percent free NCO groups and an NCO equivalent weight of about 130.
POLYISOCYANATE D was xylene diisocyanate.
ALIPHATIC MODIFIER A was a light gas oil having a boiling range of about 180°–300°C.
ALIPHATIC MODIFIER B was Stoodards solvent having a boiling range where 90 percent distills over at 190°C and the end point not higher than 210°C and containing about 3.4 weight percent aromatics.
ALIPHATIC MODIFIER C was n-decane having a boiling point of about 174°C.
ALIPHATIC MODIFIER D was n-octane having a boiling point of about 125°C.
ALIPHATIC MODIFIER E was a white lubricating oil having a viscosity of 77.7 centistokes at 100°F; a pour point of −15°F and a boiling point above 150°C commercially available from the Exxon Company as Exxon Primol No. 335.
ALIPHATIC MODIFIER F was a lubricating oil having a viscosity of 2121 Saybolt seconds at 100°F, an ASTM viscosity grade of 2150, at 15°F pour point and a boiling point greater than 150°C commercially available from the Exxon Co. as Exxon Nuray No. 146.
ALIPHATIC MODIFIER G was triisobutylene, a mixture of isomers of $(C_4H_8)_3$, having an atmospheric boiling range of 348°–354°F and a specific gravity of 0.764 at 60°F.
FATTY MODIFIER A was oleic acid.
FATTY MODIFIER B was octanoic acid.
FATTY MODIFIER C was tall oil having a specific gravity of 0.94, a viscosity of 50 Saybolt Universal seconds at 210°F, and a saponification value of 193, having a boiling point of >150°C.
FATTY MODIFIER D was a 36 carbon dimerized fatty acid having an iodine value of 13 and an acid value of 194, commercially available as Empol 1010 from Emory Industries, Inc.

FATTY MODIFIER E was castor oil.
CATALYST A was stannous octoate.
CATALYST B was a mixture of 70 wt. percent bis(2-dimethyl aminoethyl) ether and 30 percent dipropylene glycol.
CATALYST C was a 33 percent solution of triethylenediamine in dipropylene glycol.
CATALYST D was triethylamine.
CATALYST E was antimony octoate.
CATALYST F was mercuric naphthenate.

I claim:

1. A solid, rigid, non-cellular, non-porous polyurethane having a density of at least about 1 g/cc, a percent elongation of < 100, resulting from the admixture of the components of a polyurethane-forming composition, which can be demolded within 5 minutes after admixture of said components, said polyurethane-forming composition comprising
   A. a polyether polyol having a functionality of from 2 to about 8 and a hydroxyl equivalent weight of from about 60 to less than about 250;
   B. an organic polyisocyanate;
   C. a modifier composition consisting essentially of
      1. from about 85 to about 30 percent by weight of a liquid aliphatic hydrocarbon having a boiling point of at least about 150°C and
      2. from about 15 to about 70 percent by weight of a liquid fatty acid, fatty oil or mixture thereof having a boiling point of at least about 150°C; and
   D an organo-metallic catalyst for urethane formation;
   wherein components (A) and (B) are present in quantities so as to provide an NCO:OH ratio of from about 0.8:1 to about 2:1; component (C) is present in quantities of from about 10 to about 50 percent by weight of the sum of components (A), (B) and (C); Component (D) is present in quantities of from about 0.1 to about 10 percent by weight of the sum of the weights of components (A), (B) and (C); with the proviso that when component (A) is an amine initiated polyether polyol, the quantity of component (D) may be zero and when component (A) is a difunctional polyether polyol, then the average NCO-functionality of component (B) is at least about 2.5.

2. A polyurethane of claim 1, wherein component (A) has an equivalent weight of from about 75 to about 200; components (A) and (B) are employed in quantities such that the NCO:OH ratio is from about 0.95:1 to about 1.1:1; and component (D) when present is employed in quantities of from about 0.1 to about 2 percent.

3. The polyurethanes of claim 2 wherein the modifier component contains from about 50 to about 80 percent by weight of (A) and from about 20 to about 50 percent by weight of (B).

4. The polyurethane of claim 3 wherein the liquid aliphatic hydrocarbon is selected from the group consisting of gas oil, lubricating oil, Stoddards solvent, triisobutylene, n-decane and mixtures thereof.

5. The polyurethane of claim 3 wherein the liquid fatty acid has from about 6 to about 24 carbon atoms.

6. The polyurethane of claim 5 wherein the liquid fatty acid is unsaturated and has from about 14 to about 20 carbon atoms.

7. The polyurethane of claim 3 wherein the liquid fatty oil is selected from the group consisting of tall oil, castor oil and mixtures thereof.

8. The polyurethane of claim 5 wherein the fatty acid was octanoic acid.

9. The polyurethane of claim 6 wherein the fatty acid was oleic acid.

10. A process for producing solid, rigid, non-cellular, non-porous polyurethane articles having a density of at least 1 g/cc, a percent elongation of less than 100, and which can be demolded within a period of about 5 minutes without the addition of an external source of heat which process comprises:
    1. admixing the components of a composition comprising:
       A. a polyether polyol having a functionality of from 2 to about 8 and a hydroxyl equivalent weight of from about 60 to less than about 250;
       B. an organic polyisocyanate;
       C. a modifier composition consisting essentially of
          1. from about 85 to about 30 percent by weight of a liquid aliphatic hydrocarbon having a boiling point of at least about 150°C and
          2. from about 15 to about 70 percent by weight of a liquid fatty acid, fatty oil or mixture thereof having a boiling point of at least about 150°C; and
       D. an organo-metallic catalyst for urethane formation;
       wherein components (A) and (B) are present in quantities so as to provide an NCO:OH ratio of from about 0.8:1 to about 2:1; component (C) is present in quantities of from about 10 to about 50 percent by weight of the sum of components (A), (B) and (C); component (D) is present in quantities of from about 0.1 to about 10 percent by weight of the sum of the weights of components (A), (B) and (C); with the proviso that when component (A) is an amine initiated polyether polyol, the quantity of component (D) may be zero and when component (A) is a difunctional polyether polyol, then the average NCO-functionality of component (B) is at least about 2.5;
    2. placing the admixed composition into a suitable mold wherein said composition solidifies within less than about 5 minutes to a solid having the aforesaid density and elongation; and
    3. subsequently demolding the resultant article from the mold.

11. The process of claim 10, wherein component (A) has an equivalent weight of from about 75 to about 200; components (A) and (B) are employed in quantities such that the NCO:OH ratio is from about 0.95:1 to about 1.1:1; and component (D) when present is employed in quantities of from about 0.1 to about 2 percent.

12. The process of claim 11 wherein the modifier component contains from about 50 to about 80 percent by weight of (A) and from about 20 to about 50 percent by weight of (B).

13. The process of claim 12 wherein the liquid aliphatic hydrocarbon is selected from the group consisting of gas oil, lubricating oil, Stoddards solvent, triisobutylene, n-decane and mixtures thereof.

14. The process of claim 12 wherein the liquid fatty acid has from about 6 to about 24 carbon atoms.

15. The process of claim 14 wherein the liquid fatty acid is unsaturated and has from about 14 to about 20 carbon atoms.

16. The polyurethane of claim 12 wherein the liquid fatty oil is selected from the group consisting of tall oil, castor oil and mixtures thereof.

17. The polyurethane of claim 14 wherein the fatty acid is octanoic acid.

18. The polyurethane of claim 15 wherein the fatty acid is oleic acid.

19. The process of claim 10 wherein said mold is that of a furniture component.

20. The process of claim 10 wherein said mold is that of a decorative object.

21. The process of claim 10 wherein said mold is that of a machine component.

* * * * *